United States Patent

Cornelius

Patent Number: 5,333,696
Date of Patent: Aug. 2, 1994

[54] REVERSIBLE PROTECTOR FOR A WORK MEMBER

[75] Inventor: Erwin D. Cornelius, Bloomington, Ill.

[73] Assignee: Caterpillar Inc., Peoria, Ill.

[21] Appl. No.: 970,458

[22] Filed: Nov. 2, 1992

[51] Int. Cl.$^5$ .................... A01B 15/00; E02F 9/28
[52] U.S. Cl. .................... 172/772; 172/719; 37/449
[58] Field of Search ............. 172/772, 772.5, 702–704, 172/699, 713, 735, 753, 752, 765, 766; 37/449, 457, 454, 455, 446, 450, 453

[56] References Cited

U.S. PATENT DOCUMENTS

| | | | |
|---|---|---|---|
| 3,171,500 | 3/1965 | Dils | 172/700 |
| 3,387,668 | 6/1968 | Mathers | 172/719 |
| 3,704,753 | 12/1972 | Hasforth et al. | 172/753 |
| 3,961,788 | 6/1976 | Helton et al. | 172/777 |
| 3,999,614 | 12/1976 | Rhoads | 172/719 |
| 4,543,276 | 10/1985 | Linger | 172/772.5 |
| 4,799,823 | 1/1989 | Williams | 172/772 |
| 4,932,478 | 6/1990 | Jones | 172/713 |
| 5,016,365 | 5/1991 | Robinson | 37/453 |
| 5,088,214 | 2/1992 | Jones | 37/451 |
| 5,119,888 | 6/1992 | Hall | 172/772.5 |

FOREIGN PATENT DOCUMENTS

1900608  1/1978  Fed. Rep. of Germany ...... 172/719

*Primary Examiner*—Randolph A. Reese
*Assistant Examiner*—Spencer Warnick
*Attorney, Agent, or Firm*—J. W. Burrows

[57] ABSTRACT

Reversible protectors are normally utilized to protect the leading edge of a work member from high wear during use. It is also advantageous to have a reversible protector that can be secured to a work member even though the work member may be composed of several components which are welded together thus adversely affecting the tolerances between the various components. In this subject arrangement, a reversible protector is provided and adapted to be mounted on and secured to a work member. The reversible protector has recesses located in the lower end thereof which, when assembled, are in mating engagement with protuberances on the work member. This mating engagement secures the lower end of the reversible protector to the work member. A pair of aligned openings are provided near the other end thereof which aligns with a transverse hole in the work member for receiving a retaining mechanism therethrough. The protuberances on the work member are protected from wear during use by respective lugs on the reversible protector that are located, when in use, directly adjacent the protuberances. The lugs also protect aligned openings in the reversible protector since the aligned openings are located behind and adjacent the respective lugs.

12 Claims, 5 Drawing Sheets

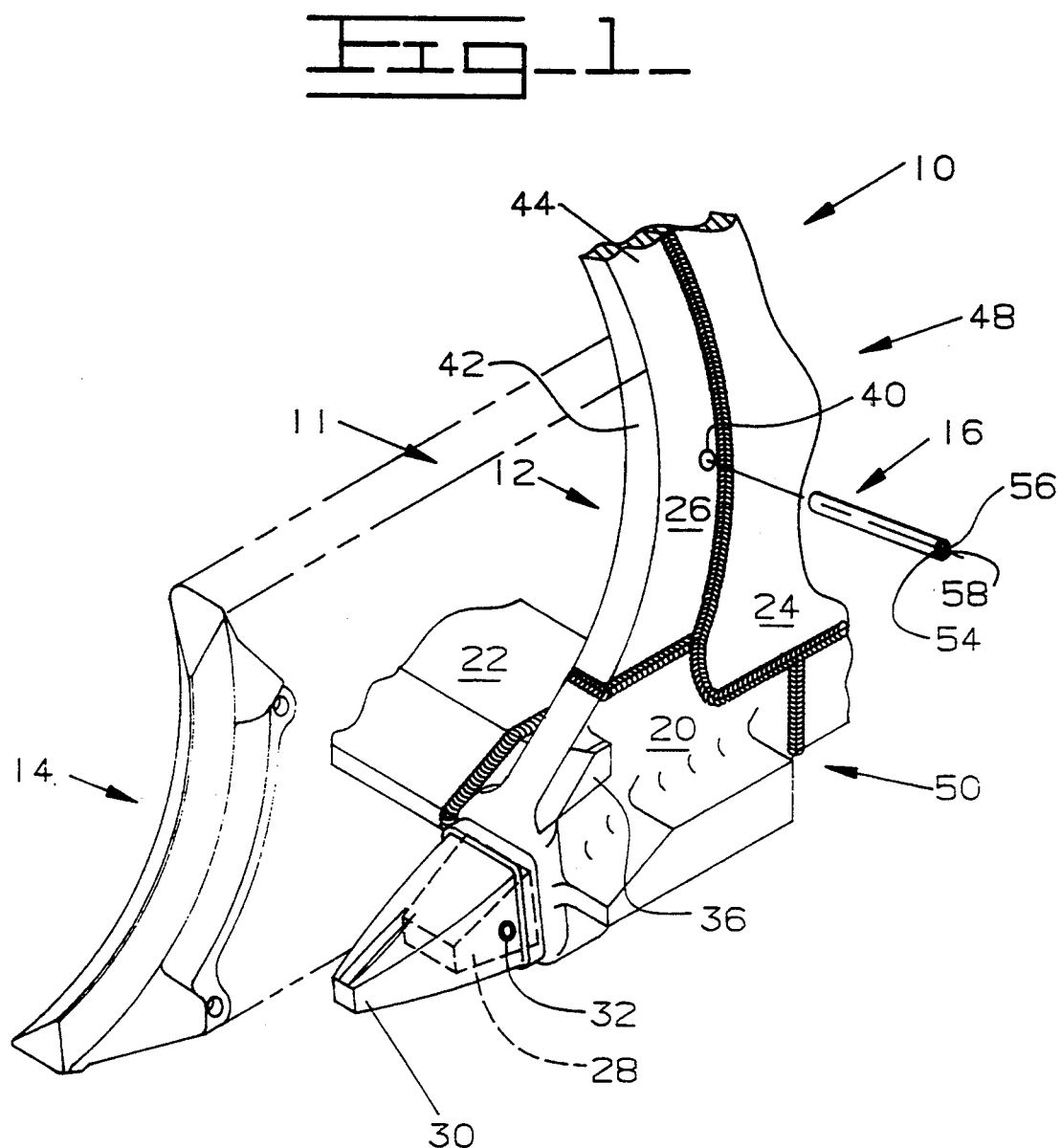
Fig_1_

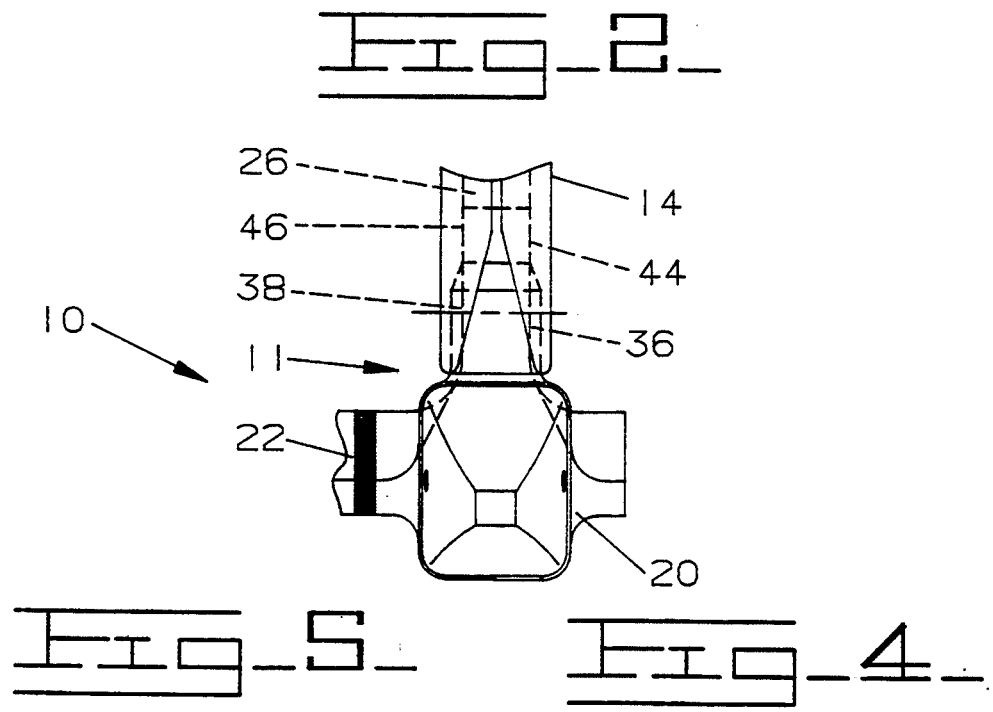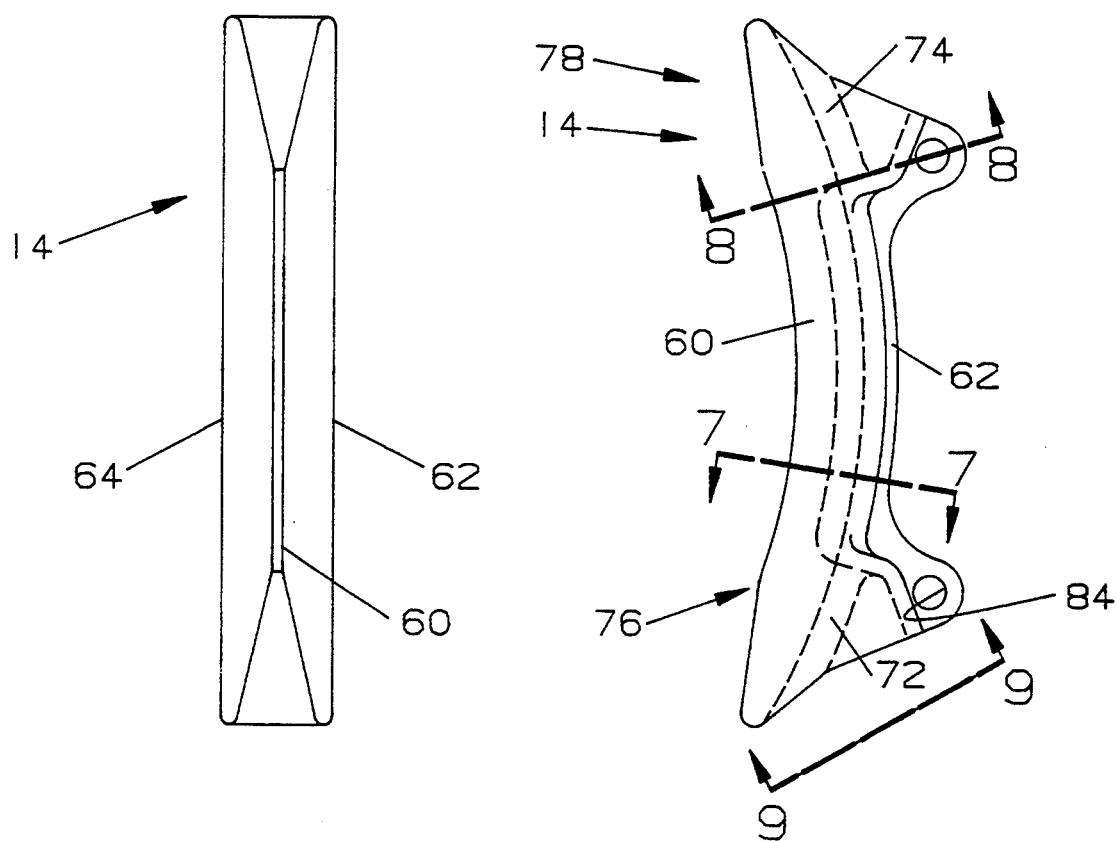

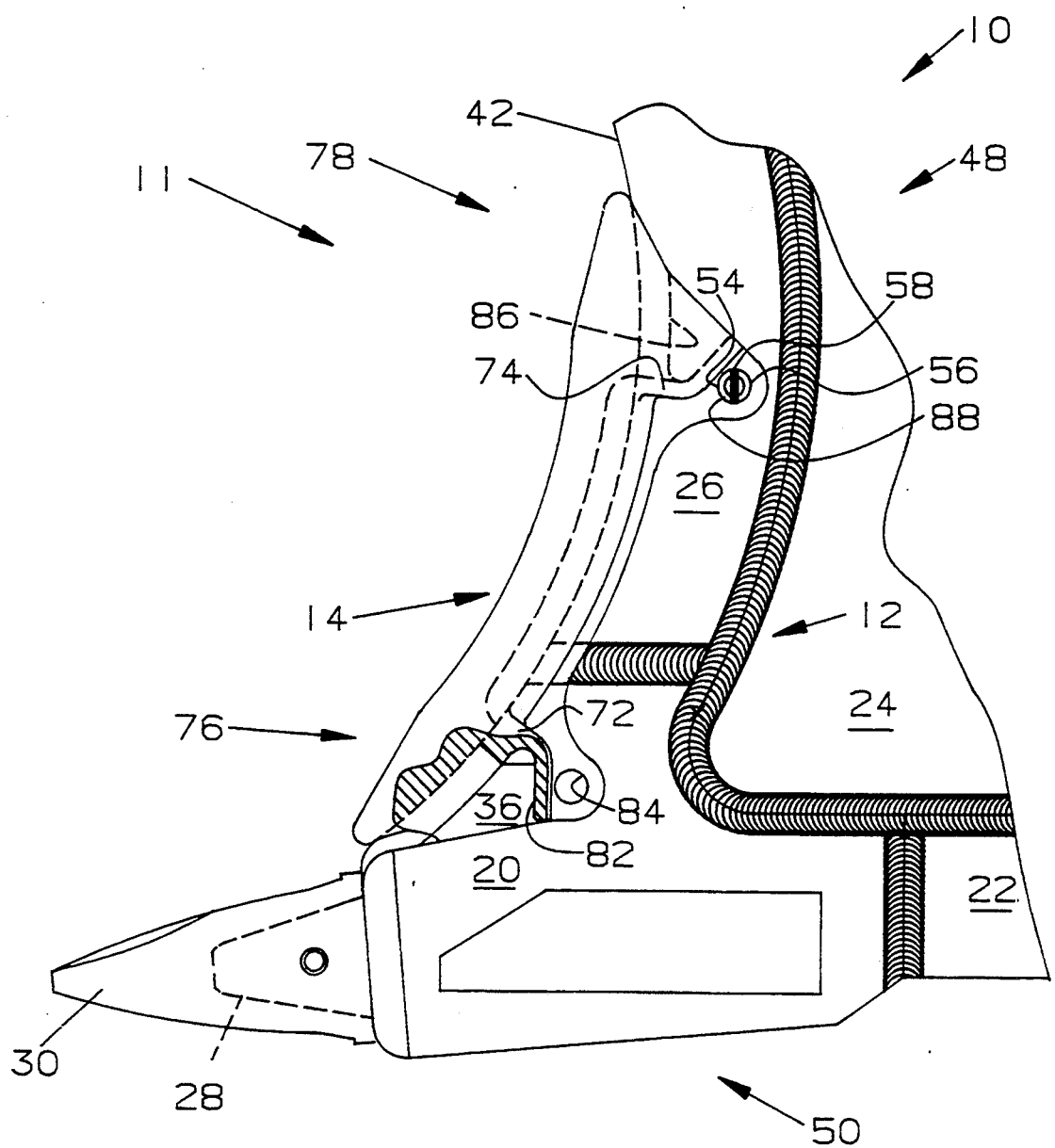
Fig_3_

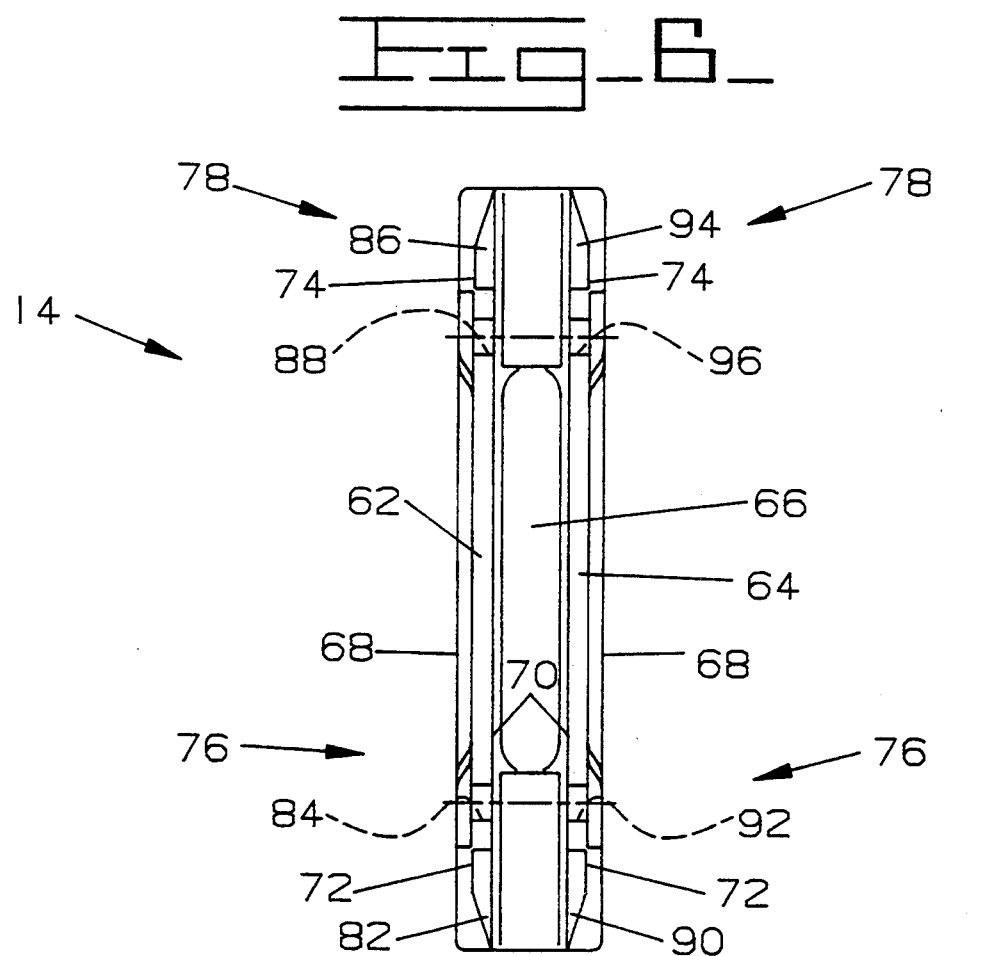
Fig_6_
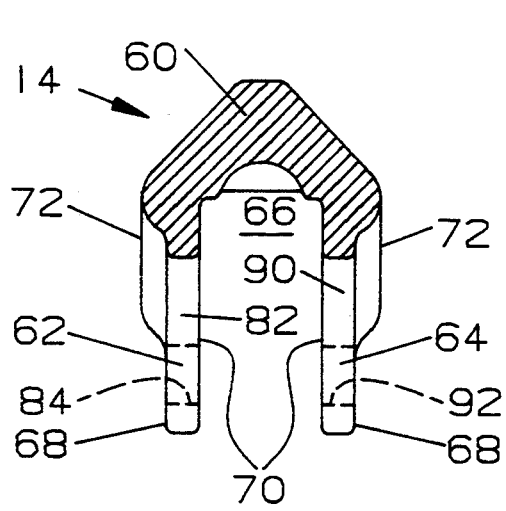
Fig_7_
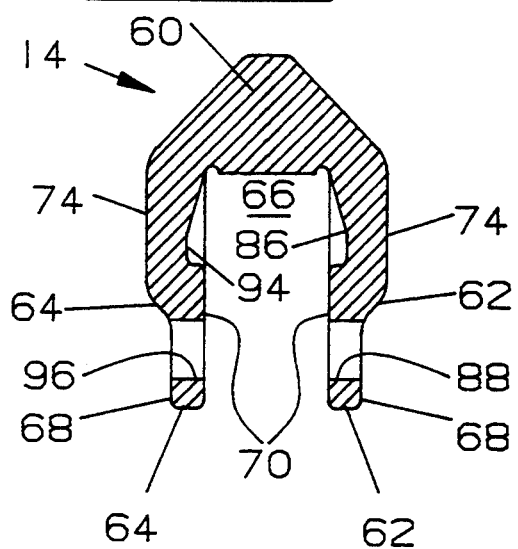
Fig_8_

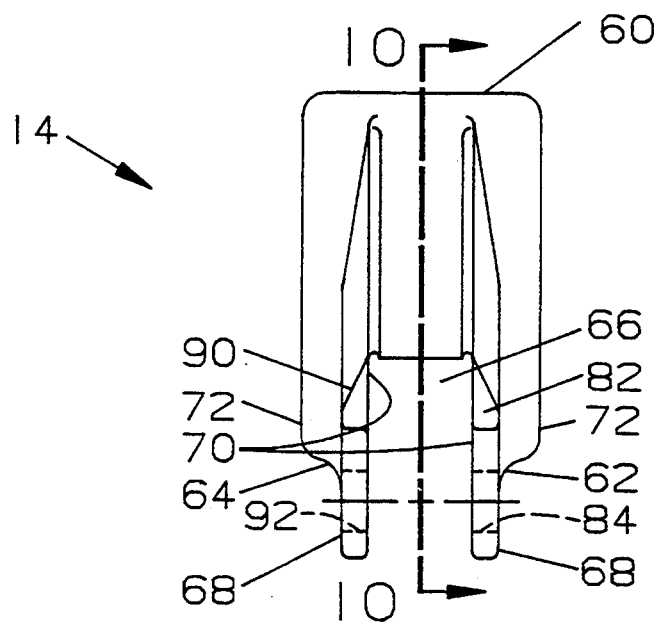
Fig_9_
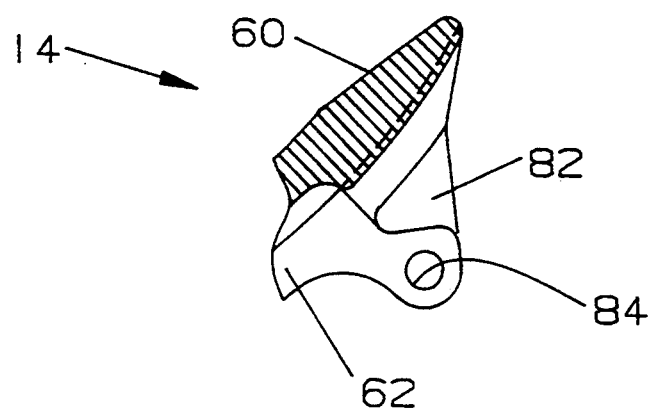
Fig_10_

REVERSIBLE PROTECTOR FOR A WORK MEMBER

DESCRIPTION

1. Technical Field

This invention relates generally to a protector for an edge of a work implement and more particularly to the configuration of a reversible protector for a work member.

2. Background Art

Protectors have been used frequently in the past to protect the leading edge of a side wall of a bucket and to protect the leading edge of a ripper shank. Normally, during use, the lower portion of the protector wears at a greater rate as compared to the upper portion thereof. Therefore, in some of these applications, the protector is designed to be reversible so that once the lower edge of the protector is worn, due to its higher frequency of contact to material being worked, it can be reversed. Consequently, the portion that has not been worn can be utilized at the lower end thereof, thus, increasing the total life of the protector.

Many of the protectors used in the past have had problems in being able to secure the protector to the leading edge without exposing the fastening means to the high wear caused by exposure to the material being worked. Furthermore, since in many applications, the bottom portion of the side wall of the bucket and/or ripper shank of the ripper is composed of various members welded together, it is difficult to maintain close tolerance between the means for fastening the protector to the bottom portion and the means for fastening the protector to the top portion. This is attributed to the fact that the fastening means on the lower portion and on the upper portion are provided thereon prior to the upper and lower portions being welded into an assembled unit. In other instances, protectors have been provided wherein the fastening means is generally protected from the wear caused by contact with the material being worked, however, in these applications, the protector is not reversible. Furthermore, in many of these instances, a replaceable tip is used to secure the protector to the leading edge of the work member. This requires removal of the replaceable tip prior to replacing the protector.

The present invention is directed to overcoming one or more of the problems as set forth above.

DISCLOSURE OF THE INVENTION

In one aspect of the present invention, a reversible protector is provided to mount on and protect a work member having a leading edge and side surfaces. The work member has a transverse hole defined therein for receiving a retaining mechanism and has at least one protuberance spaced from the transverse hole and located on one side thereof to aid in securing the reversible protector to the work member. The reversible protector has a front wall and a pair of laterally spaced side walls. Each of the side walls is connected to the front wall and has an upper end portion, a lower end portion, an outer side and an inner side. A channel is defined in the reversible protector by the front wall and the pair of laterally spaced side walls. A recess is defined in the lower end portion of one of the side walls on the inner side thereof adjacent the channel. The recess in the lower end portion of the one side wall being adapted, when assembled, to receive, overlie and protect the protuberances on the work member. Another recess is defined in the upper end portion of one of the side walls on the inner side thereof adjacent the channel. An opening is defined in the upper end portion of one of the side walls. The opening in the upper end portion of the one of the side walls is adapted, when assembled, to substantially align with the transverse hole in the work member to receive the retaining mechanism. The reversible protector also has another opening defined in the lower end portion of one of the side walls.

In another aspect of the present invention, a reversible protector assembly is provided and includes a work member, a reversible protector and a retaining mechanism. The work member has a leading edge, side surfaces, an upper portion, a lower portion, a transverse hole defined in the upper portion thereof, and a protuberance located on the lower portion on one side surface thereof. The reversible protector has a front wall, laterally spaced opposed side walls each being connected to the front wall to define a channel therein. Each of the side walls has a upper end portion, a lower end portion, an outer side and an inner side. A recess is defined in the lower end portion of the inner side of one of the opposed side walls adjacent the channel and in mating engagement with the protuberance on the work member. Another recess is defined in the upper end portion of the inner side of one of the opposed side walls adjacent the channel. A pair of aligned openings is defined in the upper end portion of the opposed side walls and is substantially in alignment with the transverse hole of the work member. Another pair of aligned openings is defined in the lower end portion of the opposed side walls. The retaining mechanism is disposed in the pair of aligned openings in the upper end portion of the reversible protector and the transverse hole in the upper portion of the work member for releasably securing the reversible protector to the work member.

The present invention provides a reversible protector that is easily mounted on the work member without having to remove the replaceable tip therefrom. Furthermore, by having the recess in the lower end portion of the reversible protector fit over and be in mating engagement with the protuberance on the work member, the problem experienced in previous arrangements of not being able to secure the protector to the work member is overcome. This allows the recess in the protector to be moved relative to the protuberance while aligning the openings in the protector with the transverse hole of the work member. The relative movement therebetween does not allow the protector to become disengaged from the protuberance on the work member.

BRIEF DESCRIPTION OF THE DRAWINGS

FIG. 1 is an isometric representation of a portion of a work implement having a reversible protector assembly incorporating an embodiment of the present invention;

FIG. 2 is a diagrammatic representation of a front view of the reversible protector assembly of FIG. 1;

FIG. 3 is a diagrammatic representation of a side view of the portion of the work implement illustrating the components of FIG. 1 in their assembled positions;

FIG. 4 is a diagrammatic representation of a side view of the reversible protector of FIG. 1;

FIG. 5 is a diagrammatic representation of a front view of the reversible protector of FIG. 4;

FIG. 6 is a diagrammatic representation of a rear view of the reversible protector of FIG. 4;

FIG. 7 is a cross-sectional view taken along the lines 7—7 of FIG. 4;

FIG. 8 is a cross-sectional view taken along the lines 8—8 of FIG. 4 to better illustrate a portion of the reversible protector;

FIG. 9 is a view looking along lines 9—9 of FIG. 4 to better illustrate another portion of the reversible protector; and FIG. 10 is a partial cross-sectional view taken along the lines 10—10 of FIG. 9.

BEST MODE FOR CARRYING OUT THE INVENTION

Referring to FIGS. 1, 2, and 3, a portion of a work implement 10 is illustrated and has a reversible protector assembly 11 which includes a work member 12, a reversible protector 14 and a retaining mechanism 16.

As clearly shown, the portion of the work implement 10 is a welded assembly composed of an adapter portion 20, a base edge portion 22, a side wall 24, and a leading edge portion 26. The work member 11 is composed of the adapter portion 20 and the leading edge portion 26. The adapter portion 20 of the work member 12 has a nose portion 28 with a replaceable tooth 30 secured thereon by a pin 32. As more clearly shown in FIG. 3, the adapter portion 20 has a first protuberance 36 located on one side of the adapter portion 20 thereof. A second protuberance 38 is a mirror image of the first protuberance and is located on the other side of the adapter portion 20 thereof. Each of the first and second protuberances 36, 38 are generally triangular in shape with the narrow portion of each protuberance being oriented in a direction towards the leading edge portion 26. The work member 12 also has a transverse hole 40 defined in the leading edge portion 26 thereof. The work member 12 has a leading edge 42 and side surfaces 44, 46 and has an upper portion 48 and a lower portion 50. The leading edge portion 26 is located in the upper portion 48 of the work member 12 while the adapter portion 20 is located in the lower portion 50 thereof. Furthermore, in each of the first and second protuberances 36, 38, the side thereof that is parallel with the leading edge 42 tapers from the outer surface thereof to the leading edge 42.

The retaining mechanism 16 is composed of two generally half diameter pins 54, 56 separated by an elastomeric material 58 which is bonded to each of the first and second generally half diameter pins 54, 56.

Referring now to FIGS. 4-10, the reversible protector 14 is composed of a front wall 60, a pair of laterally spaced side walls 62, 64 and a channel 66 defined by the front wall 60 and the laterally spaced side walls 62, 64. Each side wall of the pair of laterally spaced side walls 62, 64 is attached to the front wall 60. Each of the side walls 62, 64 has an outer side 68, an inner side 70 and first and second raised lugs 72, 74.

Each of the side walls 62, 64 is composed of a lower end portion 76 and an upper end portion 78. The lower end portion 76 of one of the side walls 62, 64 defines a recess 82 therein located adjacent the channel 66 and opening both into the channel 66 and towards the end of the lower end portion 76 thereof. The recess 82 has a shape generally the same as the shape of the first or second protuberance 36/38 and is operative to mate, when assembled, with the corresponding first or second protuberance 36/38. An opening 84 is defined in the lower end portion 76 adjacent the first lug 72.

The upper end portion 78 of the one of the side walls 62, 64 defines another recess 86 therein adjacent the channel 66 and opens both into the channel 66 and towards the end of the upper end portion 78. The shape of the recess 86 is the same as the shape of the recess 82 located in the lower end portion 76 of the one side wall 62. An opening 88 is defined in the upper end portion 78 adjacent the second lug 74.

The other of the side walls 62, 64 is a mirror image of the one of the side walls 62, 64 and has a recess 90 defined in the lower end portion 76 thereof adjacent the channel 66 and which opens both into the channel 66 and towards the end of the lower end portion 76 thereof. The shape of the recess 90 is also the same as the shape of the recess 82 located in the lower end portion 76 of the one of the side wall 62, 64. An opening 92 is defined in the lower end portion 76 adjacent the first lug 72 and is in axial alignment with the opening 84 of the one side wall member 62. The opening in the lower portion 76 of the side walls 62, 64 constitute a pair of aligned openings.

The upper end portion 78 of the other of the side walls 62, 64 also has a recess 94 defined therein adjacent the channel 66 and which opens both into the channel 66 and towards the end of the upper end portion 78 thereof. The shape of the recess 94 is likewise the same as the shape of the recess 82 located in the lower end portion 76 of the one of the side walls 62, 64. An opening 96 is also defined in the upper end portion 78 of the other of the side walls 62, 64 and is located adjacent the second lug 74 and in axial alignment with the opening 88 located in the upper end portion 78 of the one of the side walls 62, 64. The openings 88, 96 in the upper end portion 78 of the one of the side walls 62, 64 constitute a pair of aligned openings.

It is recognized that various forms of the reversible protector assembly could be utilized without departing from the essence of the invention. For example, the adapter portion 20 of the work member 12 could have only one protuberance 36, 38 located thereon and the reversible protector 14 could likewise have only one recess 82/90 located in the lower end portion 76 of one of the side walls 62, 64. Likewise, in order to maintain the reversibility of the reversible protector 14 only one recess 86/94 would be needed in the upper end portion 78 in one of the side walls 62, 64. Furthermore, even though a pair of aligned opening is preferred in both the lower and upper end portions 76, 78, it is recognized that in each of the pairs of aligned openings 84, 92/88, 96, the reversible protector 14 could be secured by utilizing only one opening as opposed to a pair of aligned openings without departing from the essence of the invention. Additionally, even though the first and second protuberances 36, 38 and the mating recesses 82, 86/90, 94 are triangular in shape, it is recognized that they could have other shapes without departing from the essence of the invention.

Industrial Applicability

During assembly of the reversible protector 14 on the work member 12, the channel 66 of the reversible protector 14 receives the leading edge 42 of the work member 12. The recesses 82, 90 of the lower end portions 76 of the one of the side walls 62, 64 receive the respective first and second protuberances 36, 38 of the adapter portion 20 of the work member 12. This secures the lower portions 76 of the reversible protector 14 to the lower portion 50 of the work member 12. The angled surface which angles from the respective first and second protuberances 36, 38 to the leading edge 42 and its mating corresponding surface in the respective recesses 82, 86, 90, 94 operate to better locate the reversible protector 14. The reversible protector 14 is further moved into its final position in which the pair of aligned openings 88, 96 in the upper end portions 78 of the reversible protector 14 is in axial alignment with the transverse hole 40 in the leading edge portion 26 of the work member 12. Once the transverse hole 40 and the aligned openings 88, 96 are in alignment, the retaining mechanism 16 is inserted therethrough to releasably secure the reversible protector 14 to the work member 12.

During welding of the adapter portion 20 to the leading edge portion 26, it is difficult to maintain close tolerances between the location of the transverse hole 40 in the leading edge portion 26 and the location of the first and second protuberances 36, 38 in the adapter portion 20. As shown in the assembly of FIG. 3, the spacing between the transverse hole 40 and the first and second protuberances 36, 38 is at its minimum spacing. However, it is readily recognized that the spacing therebetween could be greater and still not allow the lower portion of the reversible protector 14 to become free from the adapter portion 20 of the work member 12.

The upper portions 78 of the reversible adapter 14 is a mirror image of the bottom portions 76 thereof. Once the bottom portion of the reversible protector 14 is worn, it can be reversed and reassembled in the same manner as previously described, thus increasing the overall life of the reversible protector 14.

The first and second protuberances 36, 38 of the adapter portion 20 of the work member 12 are protected from wear by the respective first lug 72 located on the respective lower end portion 76 of each of the one side wall 62 and the another side wall 64. When the reversible protector 14 is reversed due to wear, the first and second protuberance 36, 38 of the adapter portion 20 is likewise protected from wear by the respective second lug 74 located on the upper end portion 78 of each of the side wall 62, 64.

When the reversible protector 14 is in its initial position, the unused openings 84, 92 located on the respective lower portions of the side walls 62, 64 are protected from wear by the respective first lugs 72. This is attributed to the fact that the unused openings 84, 92 are located adjacent the respective first lugs 72 and oriented behind the respective first lugs 72. Consequently, when the reversible protector 14 is being used to work materials, the unused openings 84, 92 are protected from the materials being worked by the first lugs 72. Likewise, when the reversible protector 14 is reversed to its opposite position, the openings 84, 88 are utilized to secure the reversible protector 14 to the work member 12 and now the openings 88, 96 become the unused openings. The now unused openings 88, 96 are likewise protected during use since they are located behind the respective second lugs 74.

In view of the foregoing it is readily apparent that the structure of the present invention provides a reversible protector assembly 10 which overcomes the problems of maintaining close tolerances between components needed to secure the reversible protector 14 to the work member 12. Likewise, the first and second lugs 72, 74 on the reversible protector 14 serve to protect, during use, the protuberances 36, 38 of the work member 12 from wear while also protecting the respective aligned openings 84, 92, 88, 96 adjacent thereto from wear.

Other aspects, objects, and advantages of this invention can be obtained from a study of the drawings, the disclosure, and the appended claims.

I claim:

1. A reversible protector adapted to mount on and protect a work member having a leading edge and side surfaces, the work member has a transverse hole defined therein for receiving a retaining mechanism and at least one protuberance spaced from the transverse hole and located on one side thereof to aid in securing the reversible protector to the work member, the reversible protector comprising:

a front wall;

a pair of laterally spaced side walls each having an upper end portion, a lower end portion, an outer side, and an inner side and being connected to the front wall;

a channel being defined in the reversible protector by the front wall and the laterally spaced side walls;

a recess being defined in the lower end portion of one of the side walls on the inner side thereof adjacent the channel, the recess in the lower end portion of the one of the side walls being adapted, when assembled, to receive, overlie, and protect the protuberance located on the work member;

another recess being defined in the upper end portion of the other of the side walls on the inner side thereof adjacent the channel and operative to permit the protector to be assembled in the reverse direction;

an opening being defined in the upper end portion of one of the side walls, the opening in the upper end portion of the one of the side walls being adapted, when assembled, to substantially align with the transverse hole in the work member and to receive the retaining mechanism; and another opening being defined in the lower end portion of one of the side walls and operative to align with the transverse hole in the work member to receive the retaining mechanism when the protector is assembled in the reverse direction.

2. The reversible protector of claim 1 wherein an additional opening is defined in the upper end portion of the other of the side walls and is in substantial alignment with the first mentioned opening.

3. The reversible protector of claim 2 wherein yet another opening is defined in the lower end portion of the other of the side walls and is in substantial alignment with the another opening.

4. The reversible protector of claim 3 wherein an additional recess is defined in the lower end portion of the other of the side walls on the inner side thereof adjacent the channel and adapted, when assembled, to receive, overlie, and protect another protuberance located on the other side of the work member directly opposite the first protuberance.

5. The reversible protector of claim 4 wherein yet another recess is defined in the upper end portion of the one of the side walls on the inner side thereof adjacent the channel.

6. The reversible protector of claim 5 wherein first and second lugs are located on the outer side of the lower end portion and the upper end portion of each of the side walls at a location generally in transverse alignment with the respective recesses defined in the respective inner sides thereof.

7. The reversible protector of claim 6 wherein the first mentioned opening and the additional opening in substantial alignment therewith and the yet another opening and the another opening in substantial alignment therewith are each located in the respective sidewalls generally adjacent the respective lugs.

8. A reversible protector assembly comprising:
   a work member having a leading edge, side surfaces, an upper portion, a lower portion, a transverse hole defined in the upper portion, and a protuberance located on the lower portion on one of the side surface thereof;
   a reversible protector having a front wall, laterally spaced opposed side walls each having an upper end portion, a lower end portion, an outer side, and an inner side and being connected to the front wall, a channel being defined therein by the front wall and the opposed side walls, a recess being defined in the lower end portion of the inner side of one of the opposed side walls adjacent the channel to receive, overlie and protect the protuberance on the work member, another recess being defined in the upper end portion of the inner side of one of the opposed side walls adjacent the channel, a pair of aligned openings being defined in the upper end portion of the opposed side walls and being substantially in alignment with the transverse hole of the work member, and another pair of aligned openings being defined in the lower end portion of the opposed side walls; and
   a retaining mechanism being disposed in the pair of aligned openings in the upper end portion of the reversible protector and the transverse hole in the upper portion of the work member.

9. The reversible protector assembly of claim 8 wherein the work member has a second protuberance located on the lower portion on the other side surface opposite the first protuberance and the reversible protector has an additional recess defined in the lower end portion of the inner side of the other of the opposed side walls adjacent the channel and in mating engagement with the second protuberance on the work member.

10. The reversible protector assembly of claim 9 wherein the reversible protector has yet another recess defined in the upper end portion of the inner side of the other of the opposed side walls adjacent the channel.

11. The reversible protector assembly of claim 10 wherein the reversible protector has lugs located on the outer side of the lower end portion and the upper end portion of each of the sidewalls at a location generally in transverse alignment with the respective recesses defined in the inner sides thereof.

12. The reversible protector assembly of claim 11 wherein each opening of the pair of openings and the another pair of openings are located in the respective sidewalls generally adjacent the respective lugs.

* * * * *